Nov. 10, 1925.

F. S. CULVER 1,561,411

MOTOR AND HEADLIGHT CONTROL MECHANISM FOR TOY ELECTRIC LOCOMOTIVES

Filed Feb. 16, 1925

Inventor

Frank S. Culver,

WITNESSES:

By

Attorney

Nov. 10, 1925.                                                                     1,561,411
F. S. CULVER
MOTOR AND HEADLIGHT CONTROL MECHANISM FOR TOY ELECTRIC LOCOMOTIVES
Filed Feb. 16, 1925                4 Sheets-Sheet 2
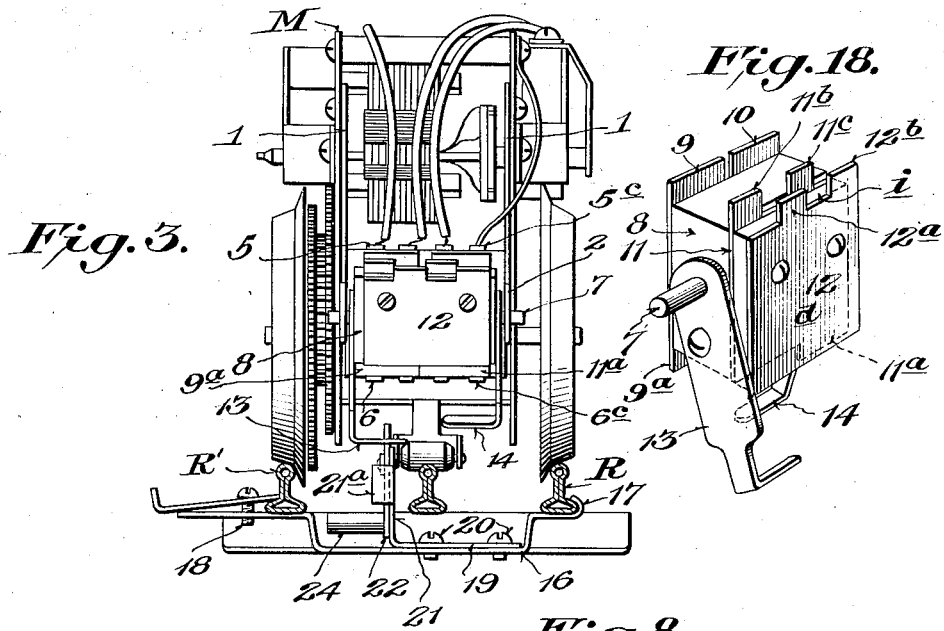
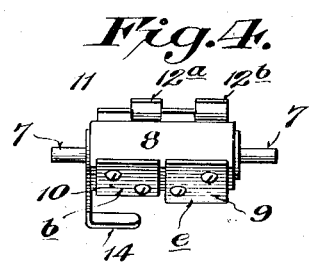
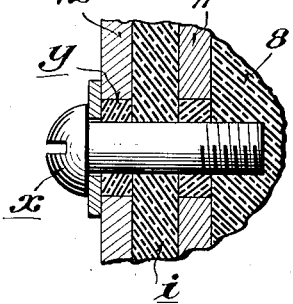
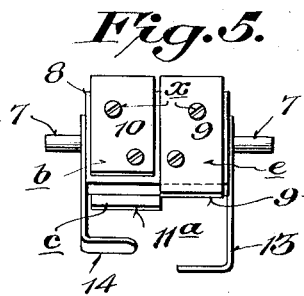
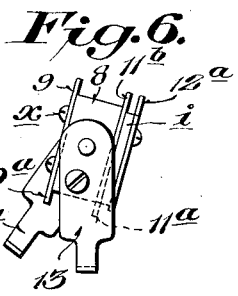
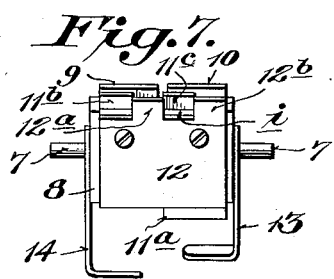
Inventor
Frank S. Culver,
By D. T. Wolhaupter
Attorney
WITNESSES:—
Chas. L. Griesbauer
Emory L. Groff Nov. 10, 1925.  F. S. CULVER  1,561,411
MOTOR AND HEADLIGHT CONTROL MECHANISM FOR TOY ELECTRIC LOCOMOTIVES
Filed Feb. 16, 1925  4 Sheets-Sheet 3
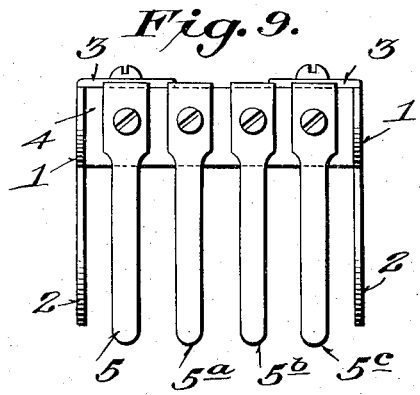
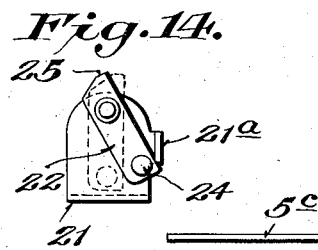
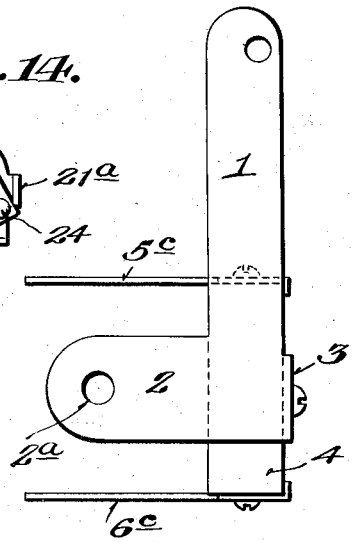
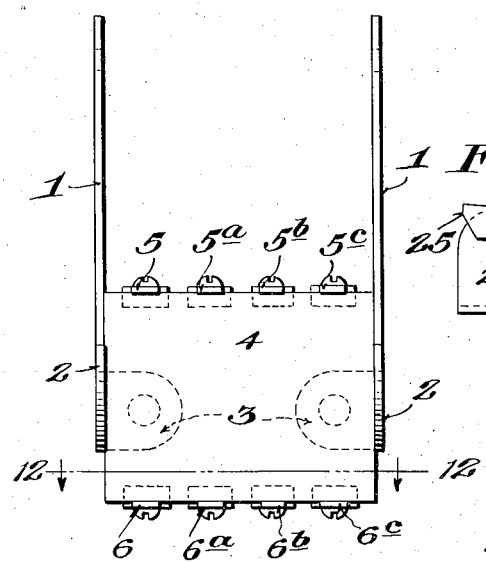
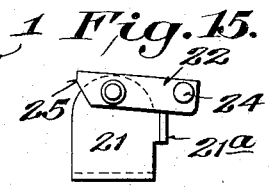
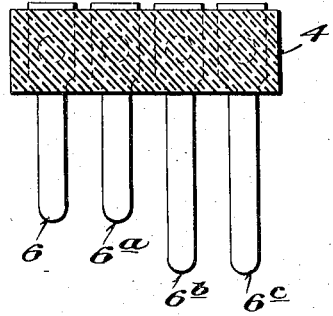
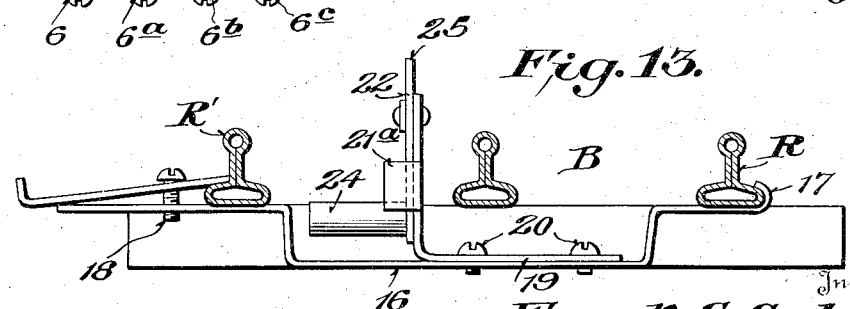
Inventor
Frank S. Culver Nov. 10 1925.

F. S. CULVER 1,561,411

MOTOR AND HEADLIGHT CONTROL MECHANISM FOR TOY ELECTRIC LOCOMOTIVES

Filed Feb. 16, 1925

Inventor
Frank S. Culver,

WITNESSES:

Patented Nov. 10, 1925.

1,561,411

UNITED STATES PATENT OFFICE.

FRANK S. CULVER, OF CHICAGO, ILLINOIS, ASSIGNOR TO AMERICAN FLYER MFG. CO., OF CHICAGO, ILLINOIS, A CORPORATION OF ILLINOIS.

MOTOR AND HEADLIGHT CONTROL MECHANISM FOR TOY ELECTRIC LOCOMOTIVES.

Application filed February 16, 1925. Serial No. 9,667.

*To all whom it may concern:*

Be it known that I, FRANK S. CULVER, citizen of the United States, residing at Chicago, in the county of Cook and State of Illinois, have invented certain new and useful Improvements in Motor and Headlight Control Mechanism for Toy Electric Locomotives, of which the following is a specification.

This invention relates to toy railways, and more particularly to a novel motor and headlight control mechanism for electrically operated locomotives.

A primary object of the invention is to provide a novel reversing mechanism including a switch adapted for use either on alternating or direct current lines, the said switch being actuated by a suitable trip device affixed to the track or track-way whereby the normal travel of the locomotive along the track will cause the switch to be engaged by the trip thereby to reverse current and cause the locomotive or train to run in the opposite direction.

Another object of the invention is to provide the novel combined motor reversing mechanism and headlight illuminating and extinguishing means so that as the current is reversed to the motor the headlight which has been burning will be extinguished and the opposite headlight of the locomotive illuminated.

A further object of the invention is to provide a novel trip unit adapted to be positioned at a selected point in the track to operate the reversing mechanism for the motor and lights, the said tripping device being constructed so that it can be readily rendered operative or inoperative at the will of the operator.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 3 is an end elevation of the construction shown in Figures 1 and 2.

Figure 4 is a top plan view of the reversing switch.

Figure 5 is a rear elevation of the reversing switch shown in Figure 4.

Figures 6 and 7 are respectively side and front elevations of the reversing switch.

Figure 8 is an enlarged detail view illustrating the manner of insulating the fastening screws for certain of the contacts of the switch.

Figure 9 is a top plan view of the frame carrying the motor and headlight control contact terminal.

Figure 10 is a front elevation of the construction shown in Figure 9.

Figure 11 is a side elevation of the construction shown in Figures 9 and 10.

Figure 12 is a horizontal sectional view taken on the line 12—12 of Figure 10.

Figure 13 is an enlarged detail view of the trip device applied to the cross section of a railway track.

Figure 14 is a detail view of the tripping means of the switch throwing unit.

Figure 15 is a view similar to Figure 14 showing the switch tripping means thrown to an inoperative position.

Figure 18 is a detail perspective view of the reversing switch.

Similar reference characters designate corresponding parts throughout the several figures of the drawings.

Figure 1:
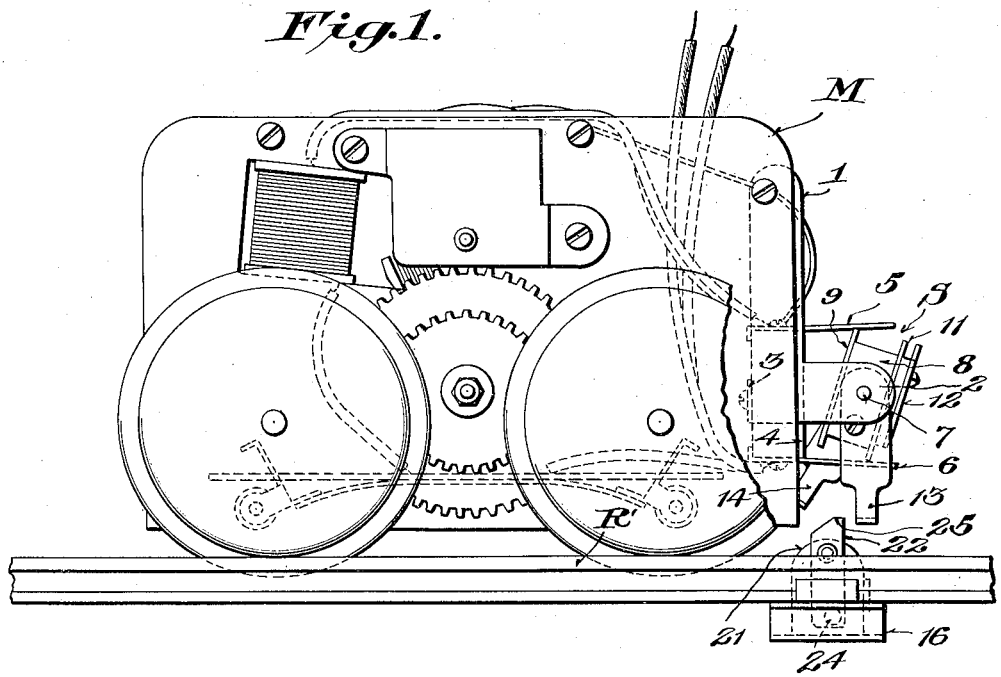
Figure 1 is a side elevation of a motor unit of a toy electric train showing the application of the present invention.

Toy trains are usually operated on circular or long tracks so arranged that the train may either have continuous or relatively long travel. Accordingly, with such a track, it is practical to attach one or more trip devices to the track at selected points so that when the locomotive reaches the reversing station it will automatically be caused to travel in the opposite direction. In that connection the present invention aims to provide a novel reversing mechanism that is controlled entirely by a track carried trip device as distinguished from reversing devices which are actuated by the relative movement of the cars or their couplings.

Referring more particularly to the drawings illustrating the invention, it will be observed that the same preferably includes a reversing mechanism and a track carried trip device B, the latter being clamped to the wheel bearing rails of the track-way and carrying a novel trip element which may be thrown into and out of operative position as desired, thereby to permit the train to move continuously in one direction or be automatically reversed according to the desire of the operator.

Referring to the reversing mechanism it will be observed that the same is adapted to be carried by the motor frame designated generally as M, and preferably includes in its organization the bracket arms 1 which have the forwardly offset portions 2 and the inturned fastening ears 3 thereby to facilitate the attachment of an insulation terminal carrying block 4. The upper and lower edges of the insulation block 4 are respectively provided with an upper series of motor control contact terminal fingers 5, $5^a$, $5^b$ and $5^c$, and the lower series of headlight control terminal fingers 6, $6^a$, $6^b$ and $6^c$, which are electrically connected with the front headlights H and rear headlights H' shown in dotted lines on the car in Figure 16 and also in the diagram, Fig. 17. Thus, the upper side of the block 4 carries motor control terminals and the lower side of the block carries the headlight control terminals both of which project to the same side of the block 4 as the arms 2.

The said arms 2 are provided with the openings $2^a$ for receiving the trunnions 7 of a novel shiftable switch member designated generally as S and provided with a plurality of circuit closing contacts for completing the circuit between the upper and lower series of contacts, as will presently appear to both reverse the current to the motor and also change the headlights with the direction of the travel of the locomotive.

The switch S includes in its organization a main block of insulation 8 which carries the journal member 7 previously referred to and also carries on one face thereof the contact plates 9 and 10 while the opposite face of the block carries the contact plates 11 and 12 which are separated by the insulation plate $i$. The contacts 9, 10, 11 and 12 are all held to the insulation block 8 by means of suitable screws $x$ which are arranged in the manner shown in Figures 5, 7 and 8, and are used in connection with the insulation washers $v$ thereby to fully insulate the screws from the plates.

Referring more particularly to the contacts 9 and 10 it will be observed from Figures 4 and 5 especially that the contact 9 which is one of the motor control contacts projects below the insulation 8 as indicated at $9^a$ thereby to also provide a headlight circuit closing contact when it is not performing the function of a motor circuit closing contact. The contact 10 serves only as a motor circuit closing contact and therefore does not extend below the insulation 8 as clearly shown in Figure 5. The contact 9 therefore performs the dual function of a motor circuit closing contact and a headlight circuit closing contact in its alternate positions.

The contact 11 also performs the dual function of a motor circuit closing contact and a headlight circuit closing contact and to that end projects beyond the bottom of the insulation block 8 as indicated at $11^a$ in Figures 5, 6 and 7. The contact plate 12 serves only as a motor circuit closing contact and only comes into play when the motor is to be reversed to travel backwardly, and to that end the said contact 12 has upstanding spaced contact fingers $12^a$ and $12^b$. Likewise the contact plate 11 is provided with the upstanding spaced contact fingers $11^b$ and $11^c$.

When the locomotive is travelling forward and the front headlight is intended to be lighted, the part $11^a$ of the contact 11 bridges the contact fingers $6^b$ and $6^c$, and likewise contact members 9 and 10 respectively bridge the contact fingers $5^a$—$5^b$ and $5^c$—$5^d$. When the locomotive is travelling forward the switch member S assumes the position shown in Figures 1 and 6.

However, when the locomotive is to be reversed the switch S is oscillated or moved by striking one of the trip units B thereby to throw the contacts 9 and 10 out of engagement with the terminals 5—$5^a$ and $5^b$—$5^c$, and also disconnect contact $11^a$ from headlight control terminals $6^b$ and $6^c$ and simultaneously connect the motor control terminals 5 and $5^b$ through the medium of the spaced contact projections $11^b$ and $11^c$ of the contact plate 11, and also connect the contact fingers $5^a$ and $5^c$ through the medium of the spaced upstanding projections $12^a$ and $12^b$ of the contact plate 12, while at the same time causing headlight contact $9^a$ to bridge the contact fingers 6 and $6^a$. (See Fig. 17.)

The opposite sides of the insulation piece 8 of the switch S are provided with pendant trip engaging arms 13 and 14 which are each disposed at an angle of approximately 16° with respect to the vertical center line of the block 8, thereby making the ends of the arms 13 and 14 approximately 32° apart. The lower ends of the arms 13 and 14 are bent inwardly thereby to provide horizontal trip engaging portions as will presently appear. Any suitable means may be utilized for holding the arms 13 and 14 to the insulation block 8. For example, the same may be provided with holes for fitting over the trunnions 7 on the center line of the block 8 and held at the proper angle by means of the screws 15.

The effect of positioning the arms 13 and 14 at the angle referred to is to cause the switch member S to always assume a relatively oblique position between the motor control terminals and the headlight control terminals, whereby the contacts at opposite sides of the insulation block 8 will be alternately brought into play as the switch is oscillated by the trip mechanism in the track-way.

The trip unit B located in the track-way preferably comprises a clamp 16 having the flange 17 for engaging with the base flange of one of the rails R and also having the screw clamp 18 for engaging the rail R' of the track-way. The body of the clamp 16 carries therewith an angular bracket 19 which may be secured thereto by any suitable means, such for example as the screws 20 and the upright arm 21 thereof supports a pivoted trip lever 22. This trip lever is provided with an opening 23 for receiving a pivot carried by the arm 21 and the lower end of the said lever is provided with a weight 24 which causes the trip to normally assume a vertical position. In addition to providing the pivotal support for the swinging lever the upright arm 21 is provided with an offset abutment 21ᵃ which is adapted to arrest the movement of the said lever in one direction so that when the nose 25 thereof is first engaged by the arm 13 for example, the said arm will cause the lever or "trip" to swing until it strikes against the abutment 21ᵃ whereupon the movement of the trip will be arrested and thereby positively throw the switch, (see Fig. 14).

As the locomotive overruns due to momentum, after the reversing switch has been thrown, it is necessary to arrange the trip member 22, so that there will be no tendency to throw the arm back as the locomotive starts to travel in the new direction. To that end the trip member is weighted and free to move in one direction. Thus when the locomotive starts its new direction after the switch has been thrown, such new movement will simply cause the weighted trip member 22 to oscillate idly away from the abutment 21ᵃ and thereby prevent accidental throwing of the switch in the direction from which it was just thrown.

Should it be desired manually to throw the trip lever 22 out of action it is only necessary to manipulate the same so that it may be turned clockwise into a position whereby it will rest upon the upper edge of the projection 21ᵃ so that the arm engaging nose 25 thereof will be below the plane of either the arm 13 or the arm 14 as the case may be. (See Fig. 15.)

Figure 16:
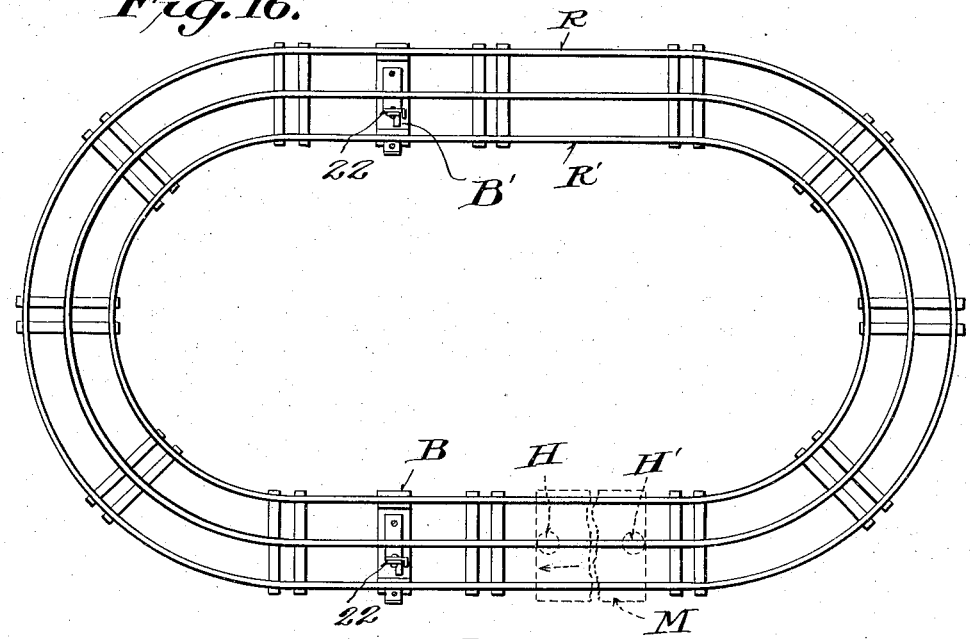
Figure 16 is a plan view of a track showing the relative location of a selected pair of trip units.

It will of course be understood that as many trip devices B may be utilized as desired although it is preferable to locate the same in the manner shown in Figure 16. These trip devices may be placed in operative position as shown in Figure 14 or in an inoperative position as shown in Figure 15, thereby to cause the train to move continuously or be automatically reversed if desired.

As will be observed from Figure 16 the trip units B—B are arranged so that the trip lever 22 of one member will be arranged between the outer rail and the third rail in one instance, and between the inner rail and the third rail in the other instance, thereby placing a trip member in the path of the arm 13 as well as in the path of the arm 14, which arms are respectively carried by opposite sides of the insulating switch block 8.

Assuming that the connections of the motor through the reversing switch are such as to cause the motor to travel toward the left in Figure 16, that is, forwardly, travel in this direction will continue until the horizontal extension of the trip arm 13 engages trip lever 22. The trip 22 will then be forced about its axis in a counter-clockwise direction until the lower portion thereof meets the under edge of the offset lug or projection 21ᵃ which retards further movement of the pivoted trip. The reversing switch device S then moves in a counter-clockwise direction until the trip arm 13 slides or slips over the trip member 22. The motor control circuit will then be changed from contact plates 9 and 10 to the spaced contact plates 11 and 12 while the headlight control contacts will have changed from the contact plate 11 to the plate 9 through the extensions 11ᵃ and 9ᵃ. This causes the extinguishing of the front headlight H and causes the rear headlight H' to become illuminated. Also the movement of the switch S about the axis provided by the trunnions 7 places the trip arm 14 in a vertical position.

Figure 2:
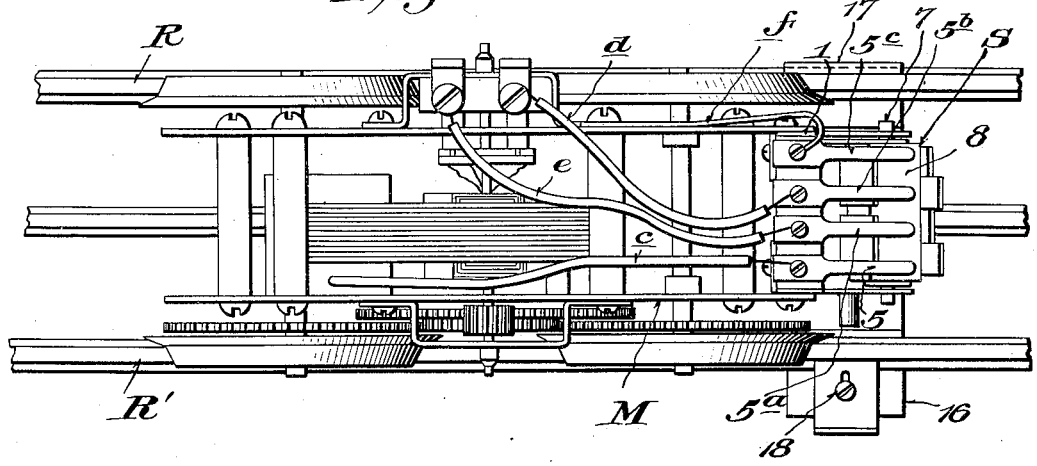
Figure 2 is a top plan view of the construction shown in Figure 1.

The direction of current flow is reversed in the motor armature and the motor travels in a reverse direction or backwards until the trip arm 14 engages the other trip unit B at the opposite side of the track. This causes the reversing switch device S to be turned about its axis, back to the position shown in Figures 1 and 2 thus changing the motor control and headlight control contact plates back to the position previously described.

Obviously the movement of the switch first one way and then the other will alternately cause the motor to travel in one direction and then the opposite direction until intentionally interrupted.

Figure 17:
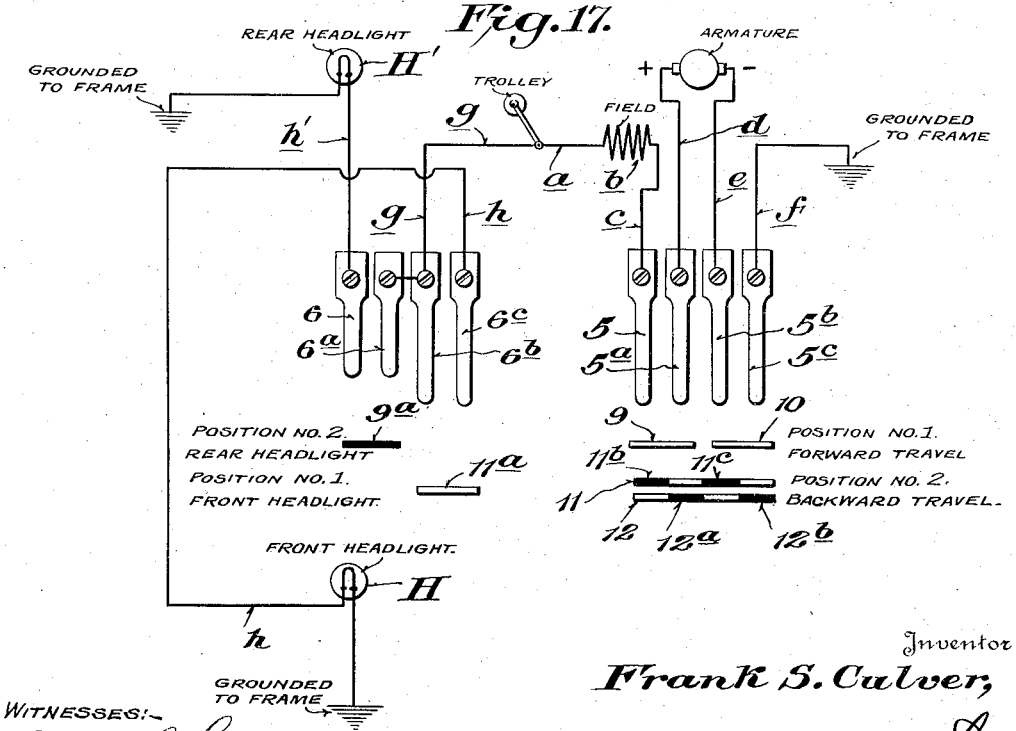
Figure 17 is a diagrammatic view showing the circuits involved.

Referring to the wiring diagram shown in Figure 17 it will be observed that current enters the system at the point marked "Trolley" which represents the third rail of the usual electric railway track system, and assuming the reversing element or switch to be set at "Position No. 1", current will flow from the trolley or third rail through wire $a$ to the field coil $b$, thence through wire $c$ to contact terminal finger 5, contact plate 9, contact terminal finger $5^a$, and thence to the positive brush of the armature of the motor, then out through the negative brush to the wire $e$ and thence to contact terminal finger $5^b$, contact plate 10, contact terminal $5^c$ and to the ground through the wire $f$. The circuit flowing in this direction causes to motor to run forward.

Also from the trolley current will flow through the wire $g$ to the headlight terminal finger $6^b$, contact $11^a$, terminal finger $6^c$ and through wire $h$ to front headlight H.

When the reversing element is placed in "Position No. 2" the path of the current from the trolley is through wire $a$, field $b$, wire $c$, finger 5, projections $11^b$ and $11^c$ of plate 11 to finger $5^b$, and thence through wire E to the negative brush of the armature. From thence the current proceeds out through the positive brush of the armature through the wire $d$, contact terminal $5^a$, projections $12^a$ and $12^b$ and plate 12 to terminal finger $5^c$ and thence to the ground through wire $f$.

When the motor is reversed the rear headlight H also becomes illuminated due to the current provided from the "trolley" through wire $g$ to terminal $6^a$, thence through $9^a$ and terminal 6 to wire $h'$ which leads to the headlight H'.

From the foregoing it will be apparent that the present invention provides a novel reversing mechanism for toy electric railways in which the current is automatically reversed by a switch device in circuit with the motor, and the headlights at opposite ends of the cab are automatically lighted and extinguished according to the direction of travel.

Without further description it is thought that the features and advantages of the invention will be readily apparent to those skilled in the art, and it will of course be understood that changes in the form, proportion and minor details of construction may be resorted to without departing from the spirit of the invention and scope of the appended claims.

I claim:

1. In a toy electric locomotive having a reversible motor and headlights at opposite ends thereof, a switch device having means for simultaneously reversing the current to the motor and the headlights, and means for operating said switch.

2. In a toy electric locomotive having a reversible motor and headlights at opposite ends thereof, a track carried trip member, and a switch device actuated by said trip member and having means for simultaneously reversing the current to the motor and the headlights.

3. A motor and headlight control mechanism for toy electric locomotives including in combination with the motor and a pair of headlights located at opposite ends of the locomotive, of a switch device for simultaneously reversing the current to the motor and illuminating and extinguishing the headlights in accordance with the direction of travel, and means in the trackway for actuating the switch.

4. A motor and headlight control mechanism for toy locomotives including in combination with the motor and a pair of headlights located at opposite ends of the locomotive, a switch device electrically connected with the motor and with both headlights, of means located on the track for shifting said switch device thereby simultaneously to reverse the current to the motor and automatically illuminate and extinguish the headlights in accordance with the direction of travel of the locomotive.

5. A motor and headlight control mechanism for toy locomotives including in combination with the motor and a pair of headlights located at opposite ends of the locomotive, of a switch device electrically connected with the motor and with both headlights, and means located on the track for shifting said switch device thereby to simultaneously reverse the current to the motor and automatically illuminate and extinguish the headlights in accordance with the direction of travel of the locomotive, said switch device comprising a frame, a series of headlight control terminal elements carried by said frame and a series of motor control terminal elements also carried by said frame, and a shiftable switch device pivoted in said frame.

6. A motor and headlight control mechanism for toy locomotives including in combination with the motor and a pair of headlights located at opposite ends of the locomotive, of abutment means located in the trackway over which the locomotive travels and a switch device carried by the locomotive and having means for simultaneously reversing the current to the motor and also to the headlights, said switch device comprising a frame carried by the locomotive, an insulation block carried by the frame, upper and lower sets of terminal fingers respectively for controlling the headlights and the motor, and a rocking switch device also pivoted in the frame between said upper and lower sets of terminal fingers, and a pair of arms projecting downwardly from said rocking switch device thereby to engage with the abutment means in the trackway.

7. A motor and headlight control mechanism for toy locomotives including in combination with the motor and a pair of headlights located at opposite ends of the locomotive, of abutment means located in the trackway over which the locomotive travels and a switch device carried by the locomotive and having means for simultaneously reversing the current to the motor and also to the headlights, said switch device comprising spaced sets of upper and lower motor control and headlight control terminal fingers, and a rocking switch member consisting of a body of insulation having a plurality of contact plates thereon and certain of said plates projecting beyond the limits of the insulation and serving to bridge adjacent terminal fingers of the motor control contacts and corresponding terminal fingers of the headlight control contacts, and arms depending from the insulation body for throwing said switch first into one position and then into the other.

8. A reversing mechanism for toy electric locomotives including in combination with the electric motor of the locomotive and the track on which the latter runs, a trip device arranged on the track, and a reversing switch device carried by the locomotive and including terminal fingers electrically connected to the motor for reversing the current thereto, a switch device including an insulating block carrying contact plates on opposite faces thereof, and means for shifting said block thereby to bring said contact plates alternately into engagement with one or the other of said set of terminal fingers.

9. A reversing mechanism for toy electric locomotives including in combination with the electric motor of the locomotive and the track on which the latter runs, a trip device arranged on the track, and a reversing switch device carried by the locomotive and including a frame carried by the locomotive, an insulation member carried by the frame, sets of motor control terminal fingers carried by the insulation member and electrically connected to the motor whereby current may be supplied thereto to reverse the same, a shiftable switch member also pivoted to the frame and carrying contacts therewith, and an arm depending from said switch member to engage the trip device on the track.

10. A reversing mechanism for toy electric locomotives including in combination with the motor of the locomotive and the track on which the latter travels, of a reversing switch carried by the locomotive, and means clamped to the rails of the track for reversing said switch device and including a track engaging clamp having an upright member located between one of the wheel bearing rails and the third rail of the track, a trip lever pivotally connected to said upright member and having a weight at its lower end, an abutment carried by said upright member for limiting the movement of the trip lever in one direction and constituting a support therefor when swung to an inoperative position.

11. A toy electric locomotive including in combination, a reversible motor, and headlights at opposite ends of the locomotive, and means for reversing the current to the motor and changing it from one headlight to the other.

12. In a toy electric locomotive, the combination with a reversible motor, of headlights located at opposite ends of the locomotive and means for simultaneously reversing the current to the motor and changing it from one headlight to the other.

13. In a toy electric locomotive, the combination with a reversible motor, of a pair of electric lamps, and means for reversing the current to the motor and changing it from one lamp to the other.

In testimony whereof I hereunto affix my signature.

FRANK S. CULVER.